Feb. 17, 1959     E. P. ORVIS     2,874,346
GENERATOR CONTROL SYSTEM Filed Jan. 12, 1955     5 Sheets-Sheet 1

FIG.1

INVENTOR.
ELMER P. ORVIS
BY Hudson, Boughton,
Williams, David & Hoffmann
ATTORNEYS

FIG. 3

INVENTOR.
ELMER P. ORVIS
BY Hudson, Broughton,
Williams, David & Hoffmann
ATTORNEYS Feb. 17, 1959  E. P. ORVIS  2,874,346
GENERATOR CONTROL SYSTEM
Filed Jan. 12, 1955  5 Sheets-Sheet 5

FIG. 5

INVENTOR.
ELMER P. ORVIS
BY Hudson, Boughton,
Williams, David & Hoffmann
ATTORNEYS United States Patent Office 2,874,346
Patented Feb. 17, 1959

2,874,346

GENERATOR CONTROL SYSTEM

Elmer P. Orvis, Fairview Park, Ohio, assignor to The Leece-Neville Company, Cleveland, Ohio, a corporation of Ohio Application January 12, 1955, Serial No. 481,399

25 Claims. (Cl. 321—16)

This invention relates to alternating current generator control, and more particularly, to an alternating current electrical generating system embodying novel generator control means. The invention is particularly suitable for vehicle electrical generating systems, including those of the alternator-rectifier type in which the alternator is driven at variable speeds by the vehicle motor and is, therefore, described hereinafter as applied to vehicle use, but without any intention of limiting the invention solely to such vehicle use.

The present invention is related, as to subject matter, to earlier application Serial No. 187,740 filed September 30, 1950 (now Patent 2,646,543 granted July 21, 1953), and this application is a continuation-in-part of application Serial No. 349,064 filed April 15, 1953, and now abandoned.

This earlier patent discloses saturable reactor means located in the field circuit of an alternator and controlled by voltage and current regulator means of the relay type for automatically controlling the field excitation in accordance with changes in the operating condition of the alternator. As is explained in such earlier patent, the use of regulator means of the relay type for controlling the field circuit of an alternator through saturable reactor means permits the generating system, and particularly an alternator-rectifier generating system, to be used for delivering higher voltages to a load circuit without subjecting the regulator contacts to high voltage or current values such as would produce destructive conditions of operation for the contacts. The saturable reactor means of the generating system of such earlier patent is of the simple reactor type as distinguished from a so-called "self-saturating" type of reactor, and hence, that system has certain limitations as to its control range, size of components, and various other characteristics.

The generating system control apparatus of the present invention is also apparatus of the relay-controlled saturable reactor type and has similar advantages but, in accordance with one of the objects of this invention, the improved control apparatus has a greatly increased operating range, greater power amplification, a faster response time and can be made smaller in size and lighter in weight.

Another object is to provide an alternator-rectifier type of generating system in which the field excitation of the alternator is automatically regulated by relay-controlled self-saturating reactor means.

Still another object is to provide generator control means of the kind above referred to in which the saturable reactor means includes control winding means whose energization is controlled by the operation of the relay contacts, and also includes a saturating coil means and a biasing coil means in opposing relation to the saturating coil means.

As another of its objects, this invention provides an improved electrical generating system having saturable reactor means in the field circuit of the generator and in which relay means responsive to the operating condition of the generator and controlling the saturable reactor means is of the double-contact type and is operable to cause a reversal of the direction of the control current to the reactor means so as to increase the operating range and effectiveness of the control apparatus.

A further object is to provide an improved electrical generating system having saturable reactor means in the field circuit of the generator and in which relay means responsive to the operating condition of the generator and controlling the saturable reactor means is of the double-contact type and includes resistor means associated with the contacts, such that the relay means is operable to vary the amount of control current to the reactor means and to reverse the direction of such control current, depending upon the effectiveness or amount of control function needed by the system.

Still another object is to provide a generating system control means of the kind above mentioned in which the field winding of the alternator is supplied with current through an auxiliary rectifier means, and in which the relay-controlled reactor means controlling the field excitation is a self-saturating reactor means having saturating coil means connected with the alternator through such auxiliary rectifier means.

Yet another object is to provide an improved electrical generating system of the character above mentioned in which the relay means controlling the saturable reactor means comprises both voltage responsive and current responsive units.

Additionally, this invention provides an improved electrical generating system in which the control winding circuit of the reactor means is connected with the generator terminals or load circuit through a voltage divider.

The invention can be further briefly summarized as consisting in certain novel combinations and arrangements of parts hereinafter described and particularly set out in the claims hereof.

In the accompanying sheets of drawings, forming a part of this specification.

Figure 1:
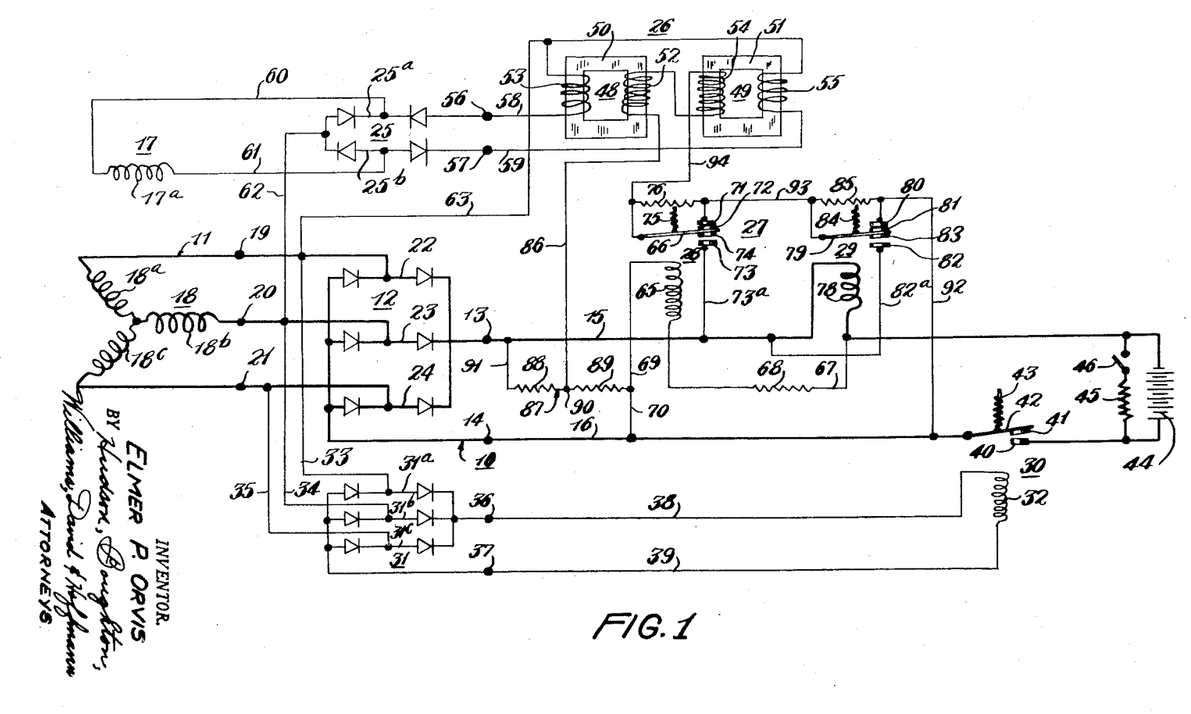
Fig. 1 is a wiring diagram illustrating electrical generating system control means embodying the present invention and employing saturable reactor means.

In the improved electrical generating system 10 of Fig. 1, an alternating current generator 11 is connected with an external direct current load circuit through a main rectifier 12 having direct current terminals 13 and 14 with which the conductors 15 and 16 of the load circuit are connected. The alternator 11 comprises relatively rotatable field and inductor units 17 and 18 carrying, respectively, a field winding 17$^a$ and a group of Y-connected inductor windings 18$^a$, 18$^b$ and 18$^c$. The alternator 11 is also provided with alternating current terminals 19, 20 and 21 with which the three circuit arms 22, 23 and 24 of the main rectifier 12 are connected. The main rectifier 12 is a full-wave, three-phase rectifier and can be of any suitable type of construction, such as a rectifier of the dry plate type.

The generating system 10 also comprises a field circuit, which in addition to the field winding 17$^a$, includes an auxiliary or field rectifier 25 and saturable reactor means 26. The saturable reactor means 26 is associated with and controlled by regulating apparatus 27 of the relay type comprising a voltage regulator unit 28 a current regultaor unit 29, and which saturable reactor means and regulating apparatus will be further described hereinafter. The generating system 10 also comprises a load relay 30 and a relay energizing circuit which includes a second auxiliary rectifier 31.

The load relay 30 comprises a magnet winding 32 which is energized from the alternator 11 through the auxiliary rectifier 31. This auxiliary rectifier is here shown as being a full-wave, three-phase rectifier having its three circuit arms $31^a$, $31^b$ and $31^c$ connected, respectively, with the alternator terminals 19, 20 and 21 by the conductors 33, 34 and 35. The rectifier 31 has direct current terminals 36 and 37 with which the magnet winding 32 of the load relay is connected by the conductors 38 and 39.

The load relay 30 also comprises cooperating stationary and movable switch contacts 40 and 41 of which the movable contact is carried by the armature 42 and is normally urged toward an open position by the spring 43. The load contacts 40 and 41 of the relay 30 are in the load conductor 16 and perform the usual function of automatically connecting and disconnecting the external load from the alternator 11. The external load is here shown as comprising a storage battery 44 and other electrical apparatus 45 controlled by a switch 46.

The saturable reactor means 26 comprises a pair of self-saturating reactors 48 and 49 having magnetic cores 50 and 51 which are made of a suitable magnetic material, such as 4% silicon steel, or other equivalent material. The reactor 48 carries a control winding 52 and a reactance coil or main load winding 53 which is the saturating coil for the core 50. Similarly, the reactor 49 carries a control winding 54 and a reactance coil or main load winding 55 which is the saturating coil for the core 51. The reactors 48 and 49 are spaced apart a suitable distance such that there is substantially no mutual inductance between these devices.

The field rectifier 25 is a full-wave bridge-type rectifier having terminals 56 and 57 each of which is connected with one end of the saturating coils 53 and 55 of the reactors 48 and 49 through conductors 58 and 59, and also having circuit arms $25^a$ and $25^b$ with which the opposite ends of the field winding $17^a$ are connected through the conductors 60 and 61. The field rectifier 25 is connected with one of the alternator terminals, for example the terminal 20, through the conductor 62, and the remote ends of the saturating coils 53 and 55 of the reactors 48 and 49 are connected with another of the phase terminals of the alternator, in this instance the terminal 19, through the conductor 63.

From the circuit arrangement just described above for the field of the alternator 11, it will be seen that the field winding $17^a$ and the conductors 60 and 61 constitute one portion of the field circuit and that the saturating coils 53 and 55 and the conductors 58, 59, 62 and 63 constitute another portion of the field circuit. In this field circuit arrangement, the field winding $17^a$ is in series circuit relation with the saturating coils 53 and 55 of the reactor means 26, such that the flow of current taking place through these saturating coils determines the amount of field energizing current, as is explained more fully hereinafter. It will also be seen that the saturating coils 53 and 55 of the reactors 48 and 49 are connected with the alternator through the auxiliary rectifier 25 and are traversed only by rectified current. It will likewise be seen from the above-described field circuit arrangement that the saturating coils 53 and 55 are located in circuit arms of the bridge-type rectifier 25 and that these saturating coils will be energized alternately by the rectified current.

The voltage regulator unit 28 of the regulating apparatus 27 comprises a voltage magnet coil 65 and a vibratory armature 66 actuating a plurality of pairs of switch contacts. The voltage coil 65 has one end thereof connected with the load conductor 15 through a conductor 67 and a ballast resistor 68 and has its other end connected with the load conductor 16 through the conductors 69 and 70.

The contacts of the voltage regulator unit 28 comprise an upper pair of cooperating stationary and movable contacts 71 and 72 and a pair of lower cooperating contacts comprising a stationary contact 73 and a movable contact 74. The movable contacts 72 and 74 are electrically connected with and carried by the armature 66. A tension spring 75 connected with the armature 66 is effective thereon to normally urge the movable contact 72 toward a position of engagement with the upper stationary contact 71. The voltage regulator unit 28 also comprises a resistor 76, conveniently referred to as a point resistor, and which is connected in shunt relation to the upper pair of contacts 71 and 72 so as to be short-circuited by the latter when they are closed. The lower contact 73 is connected with the load conductor 15 by the circuit connection $73^a$.

The current regulator unit 29 comprises a current magnet coil 78 in series relation in the external direct current load circuit and located in the load conductor 15 and a vibratory armature 79. The current regulator also comprises a pair of cooperating upper contacts consisting of stationary and movable contacts 80 and 81, and a pair of lower cooperating contacts consisting of stationary and movable contacts 82 and 83. The movable contacts 81 and 83 are electrically connected with and carried by the armature 79. A tension spring 84 connected with and effective on the armature 79 normally urges the latter in a direction to close the upper contacts 80 and 81. The current regulator unit 29 also includes a resistor 85, conveniently referred to as a point resistor, and which is so connected in shunt relation to the upper contacts 80 and 81 so as to be short-circuited when these contacts are closed. The lower contact 82 is connected with the load conductor 15 by the circuit connection $82^a$.

The control circuit by which the saturable reactor means 26 is controlled by the regulating apparatus 27 will be described next. The control windings 52 and 54 of the reactors 48 and 49 are in series relation in this control circuit. One end of this control circuit is formed by a conductor 86 which connects the outer end of the control winding 52 with the direct current load circuit through a voltage divider 87.

This voltage divider comprises a pair of resistors 88 and 89 having their adjacent ends connected to a terminal 90 with which the conductor 86 is also connected. The outer end of the resistor 88 is connected with the direct current load conductor 15 through the conductor 91, and the outer end of the resistor 89 is connected with the direct current load conductor 16 through the conductor 70.

The other end of the control circuit of the reactor means 26 is formed by a conductor 92 which connects one end of the point resistor 85 and the stationary contact 80 with the direct current load conductor 16. The point resistors 76 and 85 are connected in series relation with each other by the conductor 93 and the resistor 76 is connected with the outer end of the control winding 54 by the conductor 94.

From the reactor control circuit above described, it will be seen that for the condition of operation of the alternator 11 during which the upper contacts of the voltage and current regulator units 28 and 29 remain closed, the point resistors 76 and 85 will be short-circuited out of the control circuit and maximum energization of the control windings 52 and 54 will then take place through the control circuit. When the condition of operation of the alternator is such that the upper pair of contacts of either one of the regulator units 28 and 29 is opened by increased energization of the magnet coil of that regulator unit, the point resistor of that particular regulator unit will be inserted in series relation in the control circuit and will result in a decrease in the energizing current traversing the control windings 52 and 54.

During such operation of the regulator armatures 66 and 79 on the upper contacts 71 and 80, the energizing circuit for the control windings 52 and 54 will extend from the load conductor 16 through conductor 92, through the armatures 79 and 66 or their associated point resistors 85 and 76, and then through conductor 94 to the control windings. The return portion of this circuit is through conductor 86, resistor 88 and conductor 91 to load conductor 15.

Whenever the operating condition of the alternator 11 becomes such as to cause closing of the lower pair of contacts of either of the regulator units 28 and 29, the direction of current flow in the control circuit for the reactor means 26 will be reversed. Thus, for example, when the movable contact 74 of the voltage regulator unit 28 engages the lower stationary contact 73, energizing current will then be supplied to the control windings 52 and 54 from the direct current load conductor 16, through the resistor 89 and the conductor 86 and the return portion of the circuit will then extend to the load conductor 15 through the armature 66, the contact 73 and the conductor 73ᵃ. Since the reversal of current in the control windings 52 and 54 causes energization of the core members 50 and 51 with an opposite polarity, it will be seen that the control range covered by the saturable reactor means 26 will be much more extensive than if the reactor means were energized continuously with unidirectional control current.

It will be understood, of course, that the point resistors 76 and 85 are of a suitable resistance value such that there will be no excessive or harmful flow of current through the regulator contacts when the lower pair of contacts of either one of the regulator units closes during the operating condition explained above.

When the control current in the coils 52 and 54 is increased, as would be the case when the point resistors 76 and 85 are short-circuited out of the control circuit by a closed condition of the upper contacts of both regulator units, the flow of current traversing the saturating coils 53 and 55 will be increased, such that an increased amount of rectified current will be supplied to the field winding 17ᵃ. When the current in the control windings 52 and 54 of the saturable reactor means 26 is small, or has been reduced to a small value as by the opening of the upper regulator contacts, the effect of the reactors 50 and 51 will be to cause a decrease in the current traversing the saturating coils 53 and 55, and hence, a decrease in the rectified current being supplied to the field winding 17ᵃ.

When the above-explained reversal of control current takes place in the control circuit by the closing of the lower contacts of one of the regulator units, the current flowing through the saturating coils 53 and 55 will be such that the rectified current then being furnished to the field winding 17ᵃ will be of a minimum value producing only a small amount of field excitation. It will accordingly be seen that the wide range of control thus exercised on the field circuit through the saturable reactor means 26 will be very effective in controlling the operation of the alternator 11 in accordance with load circuit conditions in the external direct current load circuit as determined or sensed by the voltage and current regulator units 28 and 29 and by the voltage divider 87.

Figure 2:
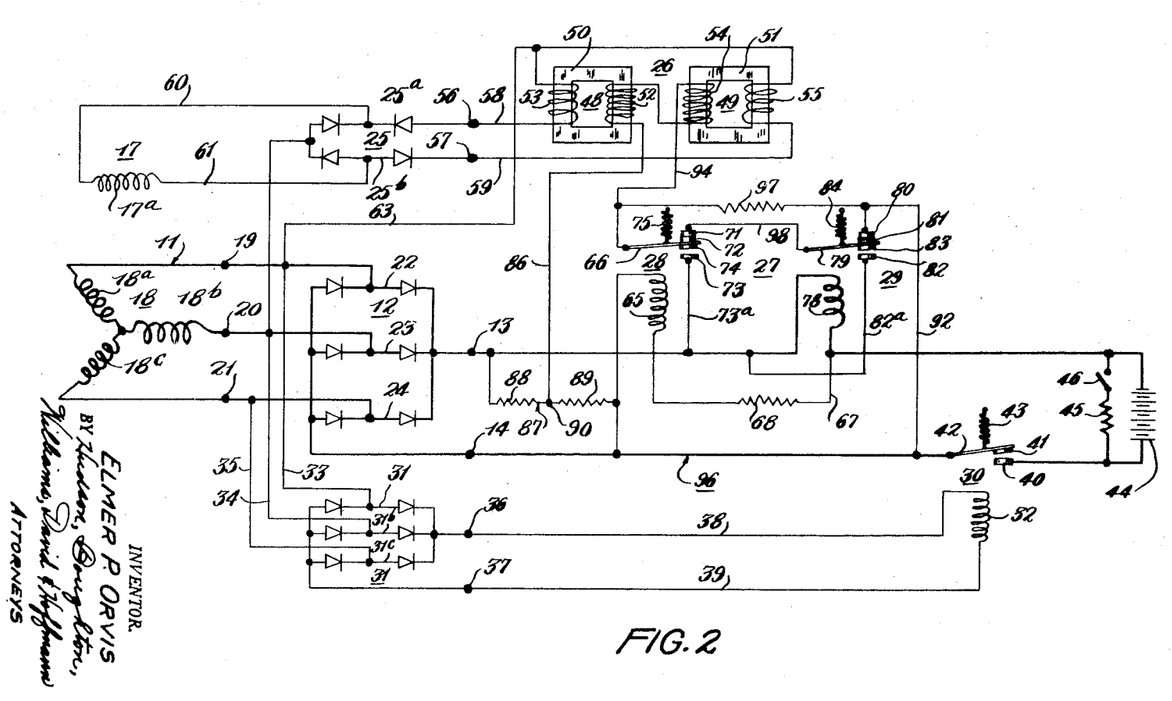
Fig. 2 is a wiring diagram showing a modified form of the generator control system and in which a more simplified circuit arrangement is employed.

Fig. 2 of the drawings shows an electrical generating system 96 similar to that of Fig. 1, and which functions in a generally similar manner. The various components of the generating system 96 which are the same as in the system of Fig. 1, have been designated by the same reference characters. In the modified generating system 96, however, the voltage and current regulator units 28 and 29 are served by a single or common point resistor 97 which takes the place of the two point resistors 76 and 85 of the system of Fig. 1. In view of the use of such single point resistor 97, the upper stationary contact 71 of the voltage regulator unit 28 is connected with the armature 79 of the current regulator unit 29 by the conductor 98.

With the control circuit arrangement shown in Fig. 2 for the saturable reactor means 26, it will be seen that whenever the upper contacts of both regulator units are closed, the resistor 97 will be short-circuited out of the control circuit and, likewise, whenever the upper contacts of either regulator unit are opened, the resistor 97 is inserted in series relation into the control circuit. It will also be seen that whenever the lower contacts of either regulator unit are closed, the direction of flow of the energizing current in the control circuit of Fig. 2 will be reversed for the accomplishment of a control function of increased range, the same as has been described above for the generating system of Fig. 1.

Figure 3:
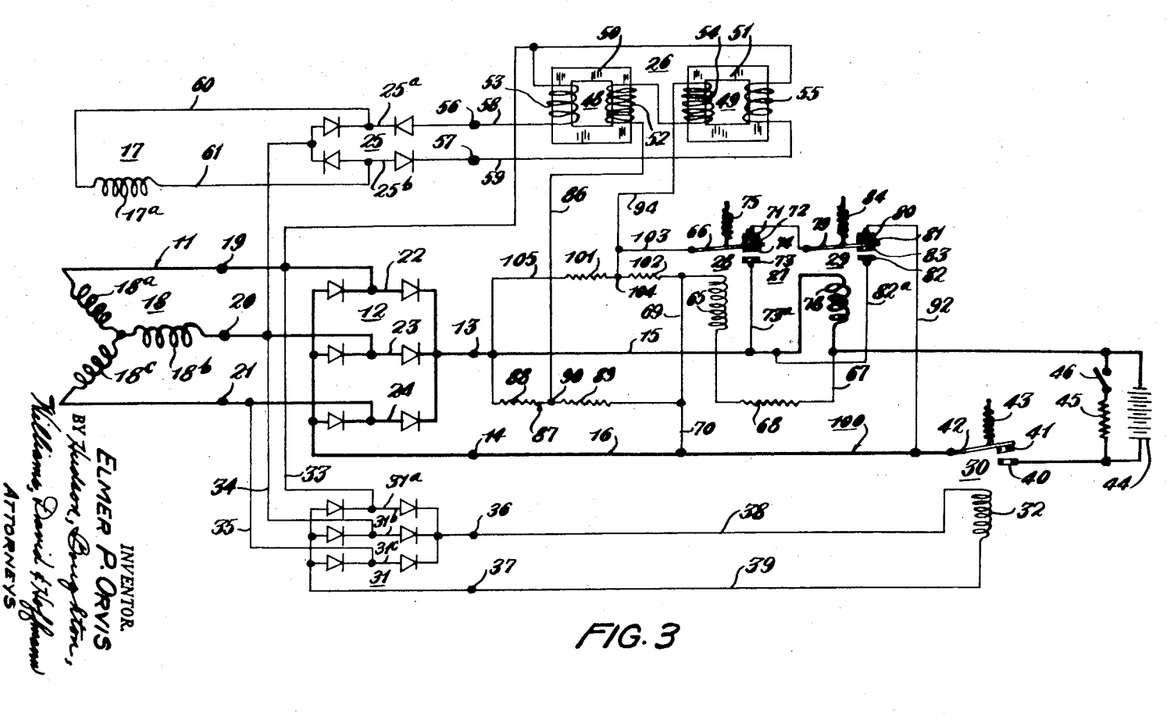
Fig. 3 is a wiring diagram showing another modified form of the generator control system.

Fig. 3 of the drawings shows another modified generating system 100 which is similar to the above-described systems of Figs. 1 and 2 and functions in a generally similar manner. The various components of the system 100 which are the same as in Figs. 1 and 2, have been designated by corresponding reference characters. In the modified generating system 100, a pair of resistors 101 and 102 have been provided in the control circuit of the saturable reactor means 26 and which take the place of the point resistors 76 and 85 of the system of Fig. 1 and occupy a somewhat different position in the control circuit.

As shown in Fig. 3, one end of the control circuit of the saturable reactor means 26 is connected with the armature 66 of the voltage regulator unit 28 through the conductor 94 and the conductor 103. This same end of the control circuit is also connected with an intermediate terminal 104 with which the adjacent ends of the resistors 101 and 102 are also connected. The outer end of the resistor 101 is connected with the direct current load conductor 15 through the conductor 105, and the outer end of the resistor 102 is connected with the direct current load conductor 16 through the conductors 69 and 70.

With the control circuit arrangement just described for the saturable reactor means 26 of Fig. 3, it will be seen that so long as the upper contacts of both regulator units 28 and 29 remain closed, the control windings 52 and 54 will be supplied with energizing current from the load conductor 16 through the conductor 92 and through the armatures 66 and 79 of the regulator units. When the upper contacts of either regulator unit are opened, the energizing current for the control windings 52 and 54 will be supplied thereto from the conductor 16 through conductors 70 and 69, through the resistor 102 and then through conductor 94 to the control windings. The return portion of this circuit is through the conductor 86 and the resistor 88 to the load conductor 15.

Closing of the lower pair of contacts of either regulator unit of Fig. 3, for example engagement of the contact 74 with the contact 73, will result in a reversal of the direction of flow of the energizing current in the control circuit by reason of the fact that the energizing current is then supplied from the load conductor 16 to the control windings 52 and 54 through conductor 70, resistor 89 and conductor 86. The return portion of this circuit is through the conductor 94, through the armature 66 and the conductor 73ᵃ to the load conductor 15. Upon the reopening of the bottom contacts, the resistor 101 will be inserted into the control circuit to reduce the value of the reverse-direction energizing current being supplied to the control windings at that time. The provision of the point resistor 101 for the lower contacts of the regulator units 28 and 29 protects these lower contacts and increases the life thereof.

Figures 4, 6:
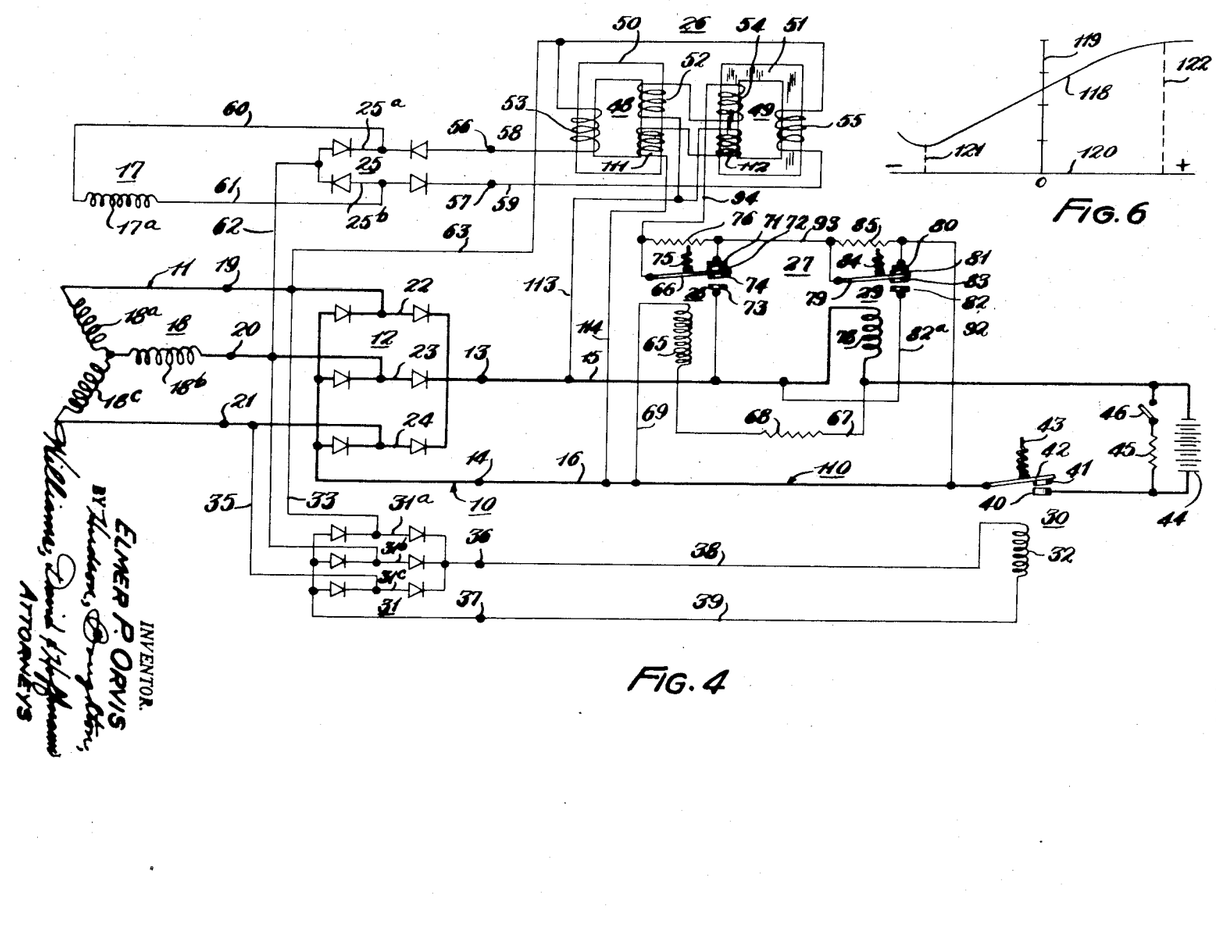
Figs. 4 and 5 are wiring diagrams showing generator control systems similar to those of Figs. 1 and 2 but in which the saturable reactor means includes a biasing coil means.
Fig. 6 is a graph illustrating the extended range of the apparatus of Figs. 4 and 5.
Figure 5:
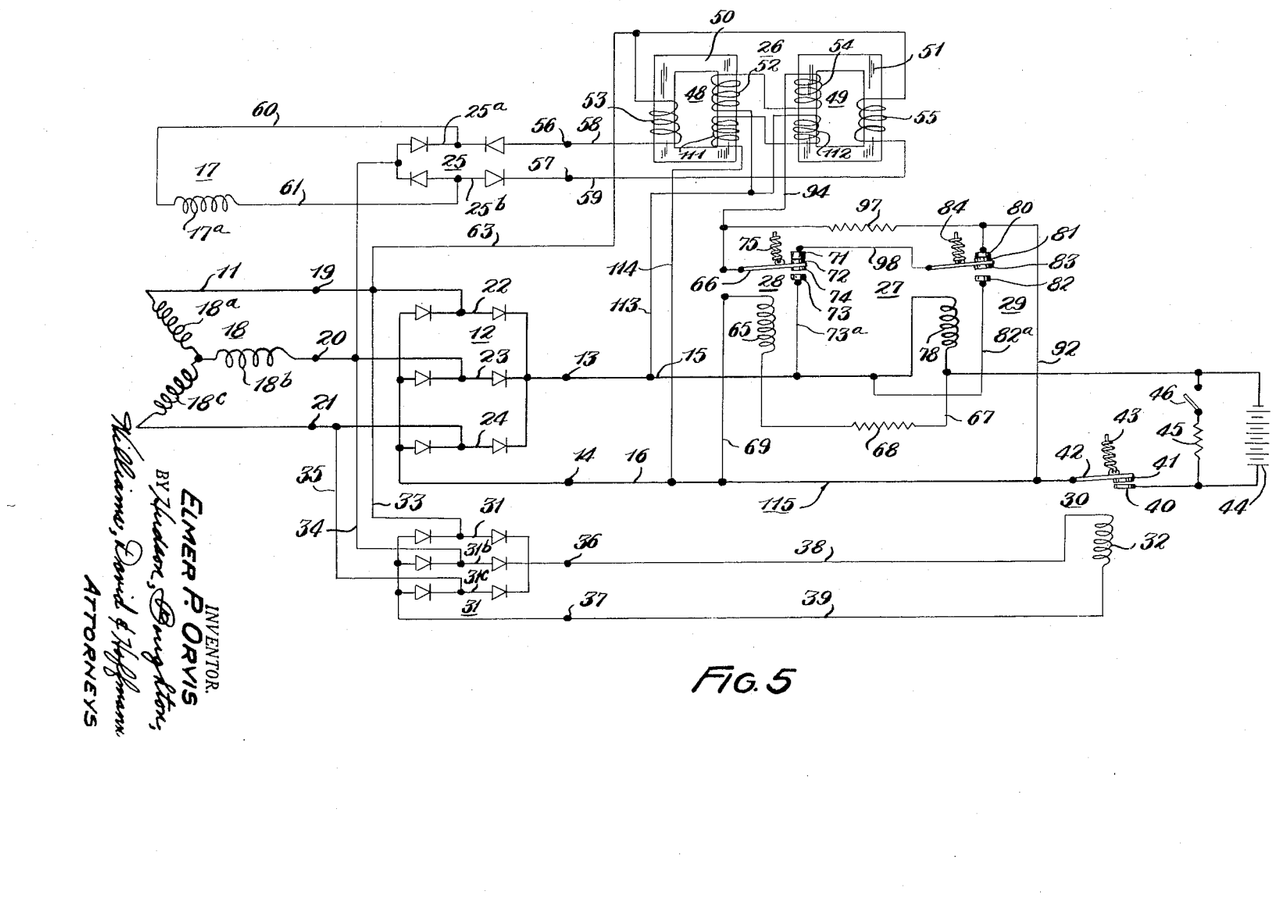

Figs. 4 and 5 of the drawings show generating systems 110 and 115 which are similar to the generating systems 10 and 96 of Figs. 1 and 2, respectively, but which represent other modifications in which the reactor means 26 is provided with a biasing winding comprising biasing coils 111 and 112 on the cores 50 and 51. In the generating systems 110 and 115, the biasing coils 111 and 112 magnetically oppose the control windings 52 and 54 and, in the operation of these systems, there is no reversal of the direction of flow of the energizing current in the control windings as is the case in the systems of Figs. 1 to 3 inclusive.

The biasing coils 111 and 112 are in series and are connected across the direct current terminals 13 and 14 of the main rectifier 12 by means of the conductors 113 and 114, such that these biasing coils are continuously energized by rectified current during the operation of the alternator 11. The voltage divider 87 of Figs. 1 and 2 has been omitted from the systems 110 and 115. The control windings 52 and 54 are also in series and have one end thereof connected with the load conductor 15 and the direct current terminal 13 through the conductor 113.

The other end of the control windings 52 and 54 is connected with the regulator 27 through the conductor 94, such that the resistors 76 and 85 of Fig. 4 and the resistor 97 of Fig. 5 are intermittently included in, or short-circuited out of, the energizing circuit of the control windings 52 and 54 during the opening and closing of the pairs of cooperating regulator contacts 71, 72 and 80, 81. The vibratory action of the pairs of contacts 71, 72 and 80, 81 thus varies the energization of the control windings 52 and 54 in accordance with the operating condition of the alternator.

When the operating condition of the generating systems 110 and 115 is such that the movable contacts 74 and 83 engage the stationary contacts 73 and 82, respectively, the energizing circuit for the control windings 52 and 54 is substantially short-circuited, whereupon the flux fields produced by these control windings are substantially fully collapsed during the time that the pairs of contacts 73, 74 and 82, 83 remain closed.

The graph of Fig. 6 illustrates the functioning of the generating systems 110 and 115 and in this view the curve 118 graphically represents values of terminal output voltage of the alternator 11 measured along the vertical axis 119 and plotted against control winding excitation of the reactor means 26 in ampere-turns measured along the horizontal axis 120. The portion of the curve 118 which is intercepted between the vertical lines 121 and 122 represents the rectifier output voltage of the rectifier 25.

The portion of the axis 120 lying between the line 121 and the vertical axis 119 graphically represents the opposing influence of the biasing coils 111 and 112, the ampere-turn value of these coils being a substantially constant minus value by which the operating point is displaced in the negative direction from the zero axis 119 to the line 121. The ampere-turns of the control windings 52 and 54 are variable by the vibratory-contact regulator unit 27 and the portion of the horizontal axis 120 lying between the vertical lines 121 and 122 represents the range of such variation in the ampere-turns of the control windings.

From this graphic representation of Fig. 6, it will be seen that the resultant effect of the variable energization of the control windings 52 and 54 and the substantially constant energization of the biasing coils 111 and 112 is to confine the functioning of the reactor means 26 to the operating range represented by the portion of the curve 118 which is intercepted between the vertical lines 121 and 122, such that the value of the energizing current for the field 17 will be maintained appropriate for a substantially constant terminal output voltage of the alternator. When the upper pairs of the regulator contacts 71, 72 and 80, 81 of the generating systems of Figs 4 and 5 are closed, the energization of the control windings 52 and 54 is at a maximum value and the operation of the regulating means at this time is represented by the point on the curve 118 at which this curve is intercepted by the vertical line 122. Likewise, when these upper contacts are open and the lower contacts 73, 74 and 82, 83 are closed, the operation of the regulating means is represented by the point of the curve 118 at which this curve is intercepted by the vertical line 121.

In all of the above-described generating systems 10, 96, 100, 110 and 115 it will be understood that the magnets of the voltage and current regulator units 28 and 29 and of the load relay 30 all include suitable magnetic cores, such as those disclosed for the regulator units and load relay of said earlier related application.

From the foregoing detailed description and the accompanying drawings, it will now be readily understood that this invention provides an improved electrical generating system in which regulator means of the relay type is very effective in controlling the field excitation through saturable reactor means associated with the field circuit, and that the use of self-saturating reactors in the reactor means permits the control apparatus to be of smaller size anl lighter in weight. The use of the self-saturating reactors also achieves greater power amplification in the control function enabling the apparatus to handle considerably higher field current values for a given current value in the regulator contacts, or conversely, for a required value of field current a much smaller current flow is needed through the regulator contacts such that contact life will be lengthened.

It will also be seen that the novel control means provided by this invention is especially suitable for vehicle generating systems including alternator-rectifier types of such vehicle generating systems. Additionally, it will be seen that the use of regulator means of the relay type, and preferably both voltage and current regulator units, for controlling the field excitation through saturable reactor means, provides a very effective and wide range of automatic control in response to varying conditions of operation of the generator. Likewise, it will be seen that by reason of the multiple pairs of cooperating contacts of the regulator means, the direction of flow of the control current for the saturable reactor means is automatically reversed to further extend the effective control range of the system. Additionally, it will now be understood that the use of a biasing coil means in the reactors in opposition to the control winding means also extends the control range of the apparatus.

Although the improved electrical generating system and novel control means of the present invention have been illustrated and described herein to a somewhat detailed extent, it will be understood, of course, that the invention is not to be regarded as being limited correspondingly in scope, but includes all changes and modifications coming within the terms of the claims hereof.

Having thus described my invention, I claim:

1. In an electrical generating system, an alternator having a field winding, a main rectifier connected with said alternator and having direct current terminals for connection of an external direct current load circuit therewith, a full-wave bridge-type auxiliary rectifier means having circuit arms, saturable reactor means comprising saturable cores having saturating windings and control windings thereon, circuit means connecting said field winding and said saturating windings with said alternator for energization therefrom through said auxiliary rectifier means, said saturating windings being located in circuit arms of said auxiliary rectifier means and being alternately energizable by rectified current, control circuit means connecting said control windings with said direct current terminals, and automatic switch means responsive to the operating condition of said alternator and having contact means controlling the energization of said control windings.

2. In an electrical generating system, a polyphase alternator having phase windings and a field winding; a main rectifier connected with said alternator and having direct current terminals for connection of an external direct current load circuit therewith; a full-wave bridge-type auxiliary rectifier having circuit arms; saturable reactor means comprising saturable cores having saturating windings and control windings thereon; field circuit means connecting said field winding and said saturating windings with said alternator through said auxiliary rectifier; said field circuit means having opposite ends thereof connected with different phase windings of said alternator; said saturating windings being located in circuit arms of said auxiliary rectifier and being alternately energizable by rectified current; control circuit means connecting said control windings with said direct current terminals; and relay type switch means responsive to the operating condition of the alternator and controlling the energization of said control windings through said control circuit means.

3. In an electrical generating system, an alternator having a field winding, a main rectifier connected with said alternator and having direct current terminals for connection of an external direct current load circuit therewith, field circuit means connected with said alternator and including an auxiliary rectifier for supplying rectified current to said field winding, saturable reactor means comprising core means having control winding means and reactance coil means thereon, said reactance coil means being located in said field circuit means, control circuit means connecting said control winding means with said direct current terminals, and automatic switch means responsive to the operating condition of said alternator and having contact means controlling the direction of flow of the energizing current in said control circuit means.

4. An electrical generating system as defined in claim 3 in which said automatic switch means is of the vibratory-contact relay type.

5. An electrical generating system as defined in claim 3 in which the auxiliary rectifier is a full-wave rectifier having two circuit arms, and in which the saturable reactor means comprises a pair of reactors whose reactance coil means is connected in series circuit with said field winding through said circuit arms of the auxiliary rectifier.

6. In an electrical generating system, an alternator having a field winding, a main rectifier connected with said alternator and having direct current terminals for connection of an external direct current load circuit therewith, a bridge-type auxiliary rectifier means having circuit arms, field circuit means connected with said alternator and including said field winding and said auxiliary rectifier means, saturable reactor means controlling the energization of said field circuit means and comprising a pair of saturable cores having saturating windings, control windings and bias windings thereon, means connecting said bias windings across said direct current terminals, said saturating windings being located in said circuit arms and being alternately energizable by rectified current, control circuit means connecting said control windings with said direct current terminals, and automatic switch means of the relay type responsive to the operating condition of said alternator and having contact means controlling the energization of said control circuit means.

7. In an electrical generating system, an alternator having a field winding, a main rectifier connected with said alternator and having direct current terminals for connection of an external direct current load circuit therewith, an auxiliary rectifier means, field circuit means connected with said alternator and including said field winding and said auxiliary rectifier means, self-saturating reactor means connected with said field circuit means through said auxiliary rectifier means and comprising core means having control winding means thereon, control circuit means connecting said control winding means with said direct current terminals, and automatic switch means responsive to the operating condition of said alternator and having contact means controlling the direction of flow of the energizing current in said control circuit means.

8. In an electrical generating system, an alternator having a field winding, a main rectifier connected with said alternator and having direct current terminals for connection of an external direct current load circuit therewith, field circuit means connected with said alternator and including an auxiliary rectifier for supplying rectified current to said field winding, saturable reactor means comprising core means having control winding means and reactance coil means thereon, said reactance coil means being located in said field circuit means, energizing circuit means connecting said control winding means with said direct current terminals, and electromagnetic switch means responsive to the operating condition of said alternator and having contact means comprising a plurality of pairs of cooperating contacts controlling the direction of flow of current in said energizing circuit means.

9. In an electrical generating system, an alternator having a field winding, a main rectifier connected with said alternator and having direct current terminals for connection of an external direct current load circuit therewith, field circuit means connected with said alternator and including an auxiliary rectifier for supplying rectified current to said field winding, self-saturating reactor means comprising saturable core means having control winding means and saturating coil means thereon, said saturating coil means being located in said field circuit means on the same side of said auxiliary rectifier as said field winding, energizing circuit means connecting said control winding means with said direct current terminals, electromagnetic switch means responsive to the operating condition of said alternator and having contact means comprising a plurality of pairs of cooperating contacts controlling the current in said energizing circuit means, and resistor means in said energizing circuit means including resistor means connected and arranged to be short-circuited by the closing of one pair of said cooperating contacts, said energizing circuit means being connected and arranged to short-circuit said control winding means upon closing of another pair of said cooperating contacts.

10. In an electrical generating system, an alternator having a field winding, a main rectifier connected with said alternator and having direct current terminals for connection of an external direct current load circuit therewith, field circuit means connected with said alternator and including an auxiliary rectifier means for supplying rectified current to said field winding, self-saturating reactor means controlling the energization of said field circuit means and comprising core means having thereon a control winding means and a biasing coil means, circuit means connecting said biasing coil means across said direct current terminals, control circuit means connecting said control winding means with said direct current terminals, and regulator means of the relay type having magnet coil means responsive to the operating condition of said alternator and contact means actuated by said magnet coil means and controlling said control circuit means.

11. In an electrical generating system, an alternator having a field winding, a main rectifier connected with said alternator and having direct current terminals for connection of an external direct current load circuit therewith, field circuit means connected with said alternator and including auxiliary rectifier means for supplying rectified current to said field winding, saturable reactor means comprising core means having control winding means and saturating coil means thereon, said saturating coil means being connected with the alternator through said auxiliary rectifier means, control circuit means connecting said control winding means with said direct current terminals, biasing coil means on said core means and energized from said direct current terminals in opposing relation to said control winding means, and automatic switch means responsive to the operating condition of said alternator and having contact means controlling the energization of said control winding means.

12. In an electrical generating system, an alternator having a field winding, a main rectifier connected with said alternator and having direct current terminals for connection of an external direct current load circuit therewith, field circuit means connected with said alternator and including auxiliary rectifier means for supplying rectified current to said field winding, saturable reactor means comprising core means having control winding means and saturating coil means thereon, said saturating coil means being connected with said alternator through said auxiliary rectifier means, regulator means of the relay type having magnet coil means responsive to the operating condition of said alternator and also having contact means actuated by said magnet coil means and comprising a pair of spaced stationary contacts connected respectively with said direct current terminals and a movable contact actuated by said magnet coil means and movable between said stationary contacts, and energizing circuit means for said control winding means connected with said movable contact.

13. In an electrical generating system, an alternator having a field winding, a main rectifier connected with said alternator and having direct current terminals for connection of an external direct current load circuit therewith, field circuit means connected with said alternator and including auxilary rectifier means for supplying rectified current to said field winding, saturable reactor means comprising core means having control winding means and saturating coil means thereon, said saturating coil means being connected with said alternator through said auxiliary rectifier means, a regulator of the vibratory electromagnetic type having magnet coil means connected with said direct current terminals and responsive to the operating condition of the alternator and also having contact means comprising spaced stationary contacts connected respectively with said direct current terminals and a vibratory contact movable between said stationary contacts, energizing circuit means for said control winding means having one end thereof connected with said vibratory contact and its other end connected with one of said direct current terminals, and a resistor in said energizing circuit means connected and arranged to be short-circuited by the engagement of said vibratory contact with the stationary contact which is connected with the other of said direct current terminals.

14. A generaing system as defined in claim 13 in which said regulator is a voltage regulator having a voltage magnet coil connected across said direct current terminals, and in which spring means acting on said vibratory contact normally urges the same toward engagement with the last-mentioned stationary contact.

15. In an electrical generating system, an alternator having a field winding, a main rectifier connected with said alternator and having direct current terminals for connection of an external direct current load circuit therewith, field circuit means connected with said alternator and including auxiliary rectifier means for supplying rectified current to said field winding, saturable reactor means comprising core means having control winding means and saturating coil means thereon, said saturating coil means being connected with said alternator through said auxiliary rectifier means, regulator means of the relay type having magnet coil means responsive to the operating condition of said alternator and also having contact means actuated by said magnet coil means and comprising a pair of spaced stationary contacts connected respectively with said direct current terminals and a movable contact actuated by said magnet coil means and movable between said stationary contacts, a voltage divider connected across said direct current terminals, and energizing circuit means for said control winding means having one end thereof connected with said movable contact and its other end connected with said direct current terminals through said voltage divider.

16. In an electrical generating system, an alternator having a field winding, a main rectifier connected with said alternator and having direct current terminals for connection of an external direct current load circuit therewith, field circuit means connected with said alternator and including auxiliary rectifier means for supplying rectified current to said field winding, saturable reactor means comprising core means having control winding means and saturating coil means thereon, said saturating coil means being connected with said alternator through said auxiliary rectifier means, a regulator of the vibratory electromagnetic type having magnet coil means connected with said direct current terminals and responsive to the operating condition of the alternator and also having contact means comprising spaced stationary contacts connected respectively with said direct current terminals and a vibratory contact movable between said stationary contacts, a voltage divider connected across said direct current terminals, energizing circuit means for said control winding means having one end thereof connected with said vibratory contact and its other end connected with said direct current terminals through said voltage divider, said vibratory contact and one of said stationary contacts comprising one pair of contacts and said vibratory contact and the other of said stationary contacts comprising another pair of contacts, and resistor means in said energizing circuit means comprising a resistor associated with each pair of said contacts connected and arranged to be short-circuited by the closing of its associated pair of contacts.

17. In an electrical generating system, an alternator having a field winding, a main rectifier connected with said alternator and having direct current terminals for connection of an external direct current load circuit therewith, field circuit means connected with said alternator and including auxiliary rectifier means for supplying rectified current to said field winding, saturable reactor means comprising core means having control winding means and saturating coil means thereon, said saturating coil means being connected with said alternator through said auxiliary rectifier means, a current regulator of the vibratory electromagnetic type having series magnet coil means in series circuit with said direct current terminals and responsive to the operating condition of the alternator and also having contact means comprising a pair of spaced stationary contacts connected respectively with said direct current terminals and a vibratory contact movable between said stationary contacts, energizing circuit means for said control winding means having one end thereof connected with said vibratory contact and its other end connected with one of said direct current terminals, and a resistor in said energizing circuit means connected and arranged to be short-circuited by the engagement of said vibratory contact with one of said stationary contacts.

18. In an electrical generating system, an alternator having a field winding, a main rectifier connected with said alternator and having direct current terminals for connection of an external direct current load circuit therewith, field circuit means connected with said alternator and including auxiliary rectifier means for supplying rectified current to said field winding, saturable reactor means comprising core means having control winding means and saturating coil means thereon, said saturating coil means being connected with said alternator through said auxiliary rectifier means, a voltage regulator of the relay type having voltage magnet coil means connected across said direct current terminals and responsive to the operating condition of the alternator and also having contact means actuated by said voltage magnet coil means, a current regulator of the relay type having series magnet coil means in series circuit with said direct current terminals and responsive to the operating condition of the alternator and also having contact means actuated by said series magnet coil means, and circuit means connecting said control winding means with said direct current terminals through the contact means of said voltage and current regulators such that the energizing current of said control winding means is controlled by the contact means of said regulators.

19. In an electrical generating system, an alternator having a field winding, a main rectifier connected with said alternator and having direct current terminals for connection of an external direct current load circuit therewith, field circuit means connected with said alternator and including auxiliary rectifier means for supplying rectified current to said field winding, saturable reactor means comprising core means having control winding means and saturating coil means thereon, said saturating coil means being connected with said alternator through said auxiliary rectifier means, a voltage regulator of the relay type having voltage magnet coil means connected across said direct current terminals and responsive to the operating condition of the alternator and also having contact means actuated by said voltage magnet coil means, a current regulator of the relay type having series magnet coil means in series circuit with said direct current terminals and responsive to the operating condition of the alternator and also having contact means actuated by said series magnet coil means, the contact means of each of said regulators comprising a pair of spaced stationary contacts connected respectively with said direct current terminals and a vibratory contact movable between said stationary contacts, and energizing circuit means for said control winding means connected with said direct current terminals and with the movable contacts of said voltage and current regulators.

20. In an electrical generating system; an alternator having a field winding; a main rectifier connected with said alternator and having direct current terminals for connection of an external direct current load circuit therewith; field circuit means connected with said alternator and including an auxiliary rectifier means for supplying rectified current to said field winding; self-saturating reactor means comprising core means having thereon a control winding means, a saturating coil means and a biasing coil means energized from said direct current terminals in opposing relation to said control winding means; said saturating coil means being connected with said alternator through said auxiliary rectifier means; a voltage regulator of the relay type having voltage magnet coil means connected across said direct current terminals and responsive to the operating condition of the alternator and also having contact means actuated by said voltage magnet coil means; a current regulator of the relay type having series magnet coil means in series circuit with said direct current terminals and responsive to the operating condition of the alternator and also having contact means actuated by said series magnet coil means; the contact means of each of said regulators comprising a pair of spaced stationary contacts connected respectively with said direct current terminals and a vibratory contact movable between said stationary contacts; and an energizing circuit for said control winding means having one end thereof connected with one of said direct current terminals and its other end connected with the movable contacts of said voltage and current regulators.

21. In an electrical generating system; an alternator having a field winding; a main rectifier connected with said alternator and having direct current terminals for connection of an external direct current load circuit therewith; field circuit means connected with said alternator and including an auxiliary rectifier means for supplying rectified current to said field winding; saturable reactor means comprising core means having thereon a control winding means, a saturating coil means and a biasing coil means energized from said direct current terminals in opposing relation to said control winding means; said saturating coil means being connected with said alternator through said auxiliary rectifier means; a voltage regulator of the relay type having voltage magnet coil means connected across said direct current terminals and responsive to the operating condition of the alternator and also having contact means actuated by said voltage magnet coil means; a current regulator of the relay type having series magnet coil means in series circuit with said direct current terminals and responsive to the operating condition of the alternator and also having contact means actuated by said series magnet coil means; the contact means of each of said regulators comprising a pair of spaced stationary contacts connected respectively with said direct current terminals and a vibratory contact movable between said stationary contacts; an energizing circuit for said control winding means having one end thereof connected with one of said direct current terminals and its other end connected with the movable contacts of said voltage and current regulators; and resistor means in said energizing circuit and associated with the regulator contacts and adapted to be short-circuited by the closing of certain of said contacts.

22. In an electrical generating system, an alternator having output terminals for connection of an external load circuit therewith and a field winding, field circuit means connected with said alternator and including auxiliary rectifier means for supplying rectified current to said field winding, self-saturating reactor means comprising saturable core means having control winding means and saturating coil means coupled thereto, said saturating coil means being energized from the alternator, control circuit means connecting said control winding means with said output terminals, and automatic switch means responsive to the operating condition of said alternator for controlling the direction of current flow in said control winding means.

23. In an electrical generating system, an alternator having output terminals for connection of an external load circuit therewith and a field winding, field circuit means connected with said alternator and including auxiliary rectifier means for supplying rectified current to said field winding, saturable reactor means comprising saturable core means having control winding means, biasing coil means and saturating coil means coupled thereto, said saturating coil means being energized from the alternator, control circuit means connecting said control winding means with said output terminals, and automatic switching means responsive to the operating condition of said alternator for controlling the magnitude of current flow through said control winding means.

24. In an electrical generating system, an alternator having output terminals for connection of an external load circuit therewith and a field winding, field circuit means connected with said alternator and including auxiliary rectifier means for supplying rectified current to said field winding, saturable reactor means comprising saturable core means having control winding means and saturating coil means coupled thereto, said saturating coil means being energized from the alternator through said auxiliary rectifier, control circuit means connecting said control winding means with said output terminals, and automatic switch means responsive to the operating condition of said alternator for controlling the energization of said control winding means.

25. In an electrical generating system as defined in claim 24 wherein said saturable reactor means includes a biasing winding coupled thereto.

References Cited in the file of this patent

UNITED STATES PATENTS

| | | |
|---|---|---|
| 2,066,919 | West | Jan. 5, 1937 |
| 2,161,179 | Logan | June 6, 1939 |
| 2,374,012 | Hanna | Apr. 17, 1945 |
| 2,646,543 | Gilchrist | July 21, 1953 |

FOREIGN PATENTS

| | | |
|---|---|---|
| 834,163 | France | Aug. 8, 1938 |